United States Patent [19]

Grisbrook

[11] 4,121,565
[45] Oct. 24, 1978

[54] SOLAR HEATING UNIT

[76] Inventor: Robert B. Grisbrook, 594 Gederson La., St. Louis County, Mo. 63122

[21] Appl. No.: 784,135

[22] Filed: Apr. 4, 1977

[51] Int. Cl.$^2$ ............................................. F24D 3/02
[52] U.S. Cl. ..................................... 126/270; 237/1 A
[58] Field of Search ........................ 126/270; 237/1 A

[56] References Cited

U.S. PATENT DOCUMENTS

| | | | |
|---|---|---|---|
| 3,960,135 | 6/1976 | Angilletta | 126/270 |
| 3,971,359 | 7/1976 | Bourne | 126/270 |
| 4,043,317 | 8/1977 | Scharfman | 126/270 |
| 4,059,226 | 11/1977 | Atkinson | 237/1 A |
| 4,062,346 | 12/1977 | Rapp et al. | 237/1 A |

*Primary Examiner*—Carroll B. Dority, Jr.
*Attorney, Agent, or Firm*—Ralph W. Kalish

[57] ABSTRACT

A solar heating unit for disposition exteriorly of a building window for heating the air within the space interiorly of the window embodying a casing with a transverse divider for creating a rear passage and a front passage which are in communication in their lower portions. The upper end of the rear passage connects with the forward end of a rearwardly extending lower duct having a cool air inlet at the rearward end thereof. The upper end of the front passage connects with the forward end of an upper duct progressing rearwardly above the lower duct and with there being a warm air outlet at the rearward extremity thereof. A heat exchanger is disposed within the front passage for impingement thereon of solar radiation passing through a transparent panel defining the front of said casing. A thermal responsive closure is provided at the upper end of said front passage for closing same when the temperature within the front passage has descended to a predetermined level.

17 Claims, 5 Drawing Figures

SOLAR HEATING UNIT

BACKGROUND AND SUMMARY OF THE INVENTION

This invention relates in general to solar heating and, more particularly, to a solar heating unit for removable disposition upon the exterior of a building proximate a window thereof.

With the ever rising cost in fuel for space heating purposes, efforts are being made to effectively utilize the thermal energy provided by the sun. For the most part devices heretofore created have been relatively complex in construction and oftentimes involve costly installation. In order to render solar heating available to the average home owner there has been required the development of a device which is compact; which does not necessitate involved expensive installation and is hence amenable for disposition in operative condition by the average householder; which does not require constant supervision; and which will not obscure the visibility or light transmission through a window.

Certain efforts have related to devices for disposition interiorly of a building, such as those shown in U.S. Pat. Nos. 3,960,135 and 4,002,159. But structures of the type therein shown block the associated window so as to prevent the desired light transmission therethrough, as well as to inhibit any visibility. An embodiment located outside a window is revealed in U.S. Pat. No. 2,931,578 but the same incorporates components which are secured to the jambs, header and sill of the window and incorporate side panels which constrict the angle of vision through the associated window.

The present invention comprises a self-contained structure which may, if desired, be suspended by the gripping of a component thereof between the window-sill and the lower sash so that the problem of costly, structure-modifying mounting is obviated. Such unit, which is disposed exteriorly of the window, is presented substantially downwardly thereof so that light transmission through the window is not appreciably affected and with no diminution in the angle of visibility. Additionally, the unit of the present invention embodies thermally responsive means so that the unit can be rendered inoperative automatically through a drop in the temperature to a predetermined level. Accordingly, there is no need for an individual to be concerned about placing the unit in either operative or inoperative condition as is required by prior art structure.

Therefore, it is an object of the present invention to provide a solar heating unit adapted for facile disposition exteriorly of a building, adjacent a window thereof, for heating the space interiorly of said window.

It is another object of the present invention to provide a solar heating unit of the character stated which is self-sufficient and which may be disposed in operable position without necessitating any physical modification of the building structure.

It is a further object of the present invention to provide a solar heating unit of the character stated which is designed to be automatically placed in an inoperative state responsive to predetermined thermal conditions thereby eliminating necessity of the intervention of human action for such purpose.

It is another object of the present invention to provide a unit of the character stated which does not incorporate complex moving parts so that the unit is substantially proof against damage and, hence, conducive to extreme longevity without diminution in efficacious operability.

It is a still further object of the present invention to provide a solar heating unit which may be most economically manufactured; which is fully reliable in usage and which is of marked durability, being of sturdy construction with a singular paucity of integrated components.

DESCRIPTION OF THE PREFERRED EMBODIMENT

Figure 1:
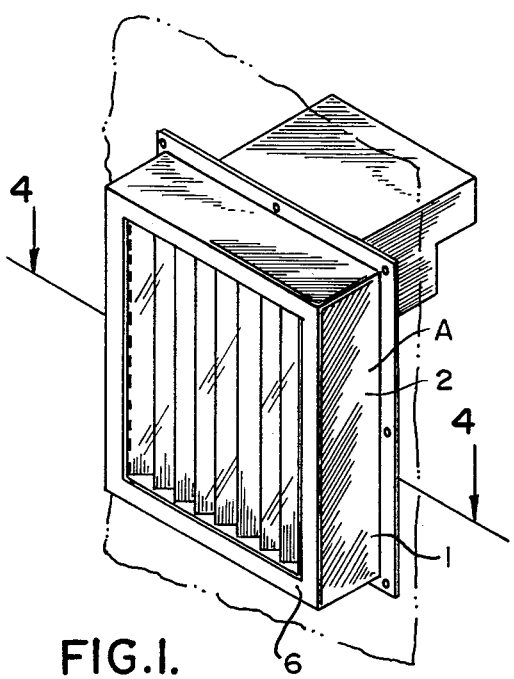
FIG. 1 is a front perspective view of a solar heating unit constructed in accordance with and embodying the present invention.
Figure 2:
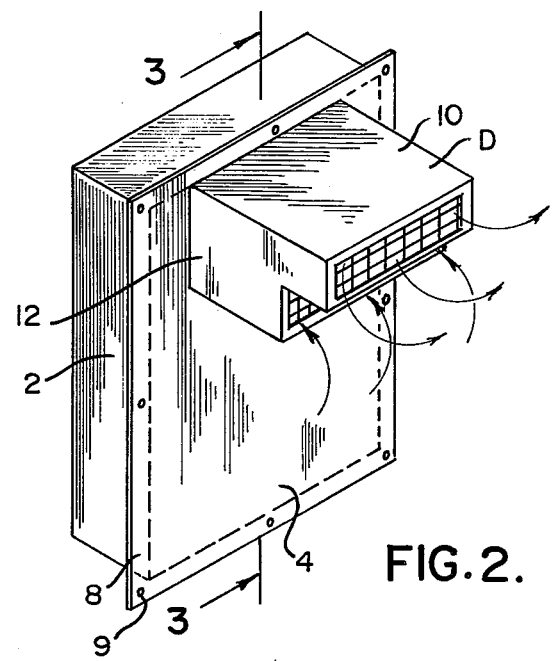
FIG. 2 is a rear perspective view.

Referring now by reference numerals to the drawings which illustrate the preferred embodiment of the present invention, A designates generally a self-contained solar heating unit designed for presentation exteriorly of a building window oriented for receiving solar radiation. Said solar heating unit A comprises a box-like casing 1 having parallel side walls 2,2', bottom and top walls 3,3', respectively, and a rear wall 4, with said casing 1 being normally opened to the front, as at 5. Disposed across the open front 5 of casing 1 and maintained therein by a marginal retainer 6 is a plane 7 of heat pervious material, such as glass or the like, thus permitting passage therethrough of solar radiation. Rear wall 4 incorporates a peripheral flange 8 projecting beyond the adjacent walls of casing 1 and having suitably spaced openings 9 for extension therethrough of fastener elements, such as screws, nails, or the like for mounting unit A upon the building wall, should such means of attachment be desired. As will be shown flange 8 provides merely an optional mounting expedient.

In the upper central portion of rear wall 4 there is provided a rearwardly extending duct section D comprising a top wall 10 preferably coplanar with top wall 3' of casing 1, a bottom wall 11, and parallel side walls 12,12'. An intermediate partition 13 extends transversely between side walls 12,12' and is suitably secured at its ends thereto; with said partition 13 being planarwise parallel to top walls 10,11 for effectively dividing the interior of duct D into upper and lower passages 14,15 defined by the adjacent portions of sides 12,12' and top and bottom walls 10,11; with the intervening partition 13 thus constituting the bottom of passage 14 and the top of passage 15. Passage 14 extends relatively further rearwardly than lower passage 15 by reason of the rearward extension of top wall 10 and partition 13 beyond the rearward edge of bottom wall 11. Each of said passages 14,15 are open at their rearward ends to define a warm air outlet 16 and a cool air inlet 17, respectively. If desired, grills g may be disposed coveringly of said outlet and inlet 16,17. By reason of the projection of passage 14 rearwardly of passage 15 the exposed undersurface of partition 13, as at 13', provides a limited baffling effect for directing cool air into said passage 15.

It is to be understood that duct D and casing 1 may be constructed of any suitable material, such as wood, pressed board, sheet metal, or the like and with the same being integrated in any conventional manner so that the precise mode of joinder of said basic components does not form a part of the present invention.

It is to be particularly observed that bottom wall 11 of duct D is of such dimension as to provide a stabilizing area of contact with the sill of a conventional window (not shown) as of the double hung sash type, so that the unit A may be maintained in operative, solar-heat receiving position by sandwiched disposition of duct D between the windowsill and the undersurface of the commensurately raised lower window sash. By this means of suspension, there is obviated any necessity for extraneous fastening means. The adjacent portions of casing rear wall 4 will suitably occlude the lateral normally open zones between side walls 12,12' of duct D and the window side jambs, although, if desired, panels or any similar expedient may be inserted therein for closure purposes. Accordingly, unit A may be easily mounted in operative position in a multiplicity of fashions which may be readily accomplished by the average home owner without difficulty.

Figure 3:
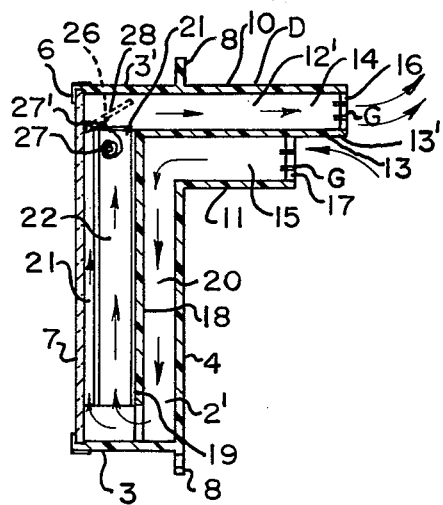
FIG. 3 is a vertical transverse sectional view taken on the line 3—3 of FIG. 2.
Figure 4:
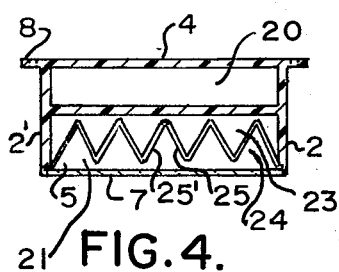
FIG. 4 is a horizontal transverse sectional view taken on the line 4—4 of FIG. 1.
Figure 5:
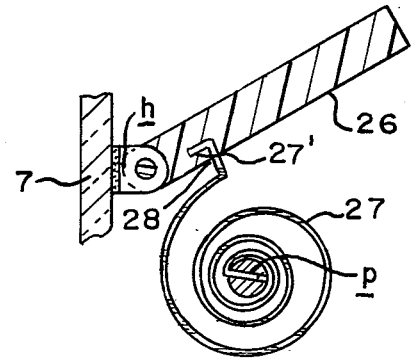
FIG. 5 is an enlarged side view in section of the closure plate and associated elements.

Extending between casing side walls 2,2' planarwise parallel to rear wall 4 and between same and pane 7 is a panel-forming divider 18, the upper end of which abuts against the under forward marginal portion of partition 13 and the lower end of which terminates spacedly above casing bottom wall 3 to define therewith a connecting passage 19 for purposes presently appearing. Said divider 18 accordingly constitutes the forward limit of passage 15 which in its forward portion communicates with the upper end of an inner, vertical passage 20 bounded by rear wall 4, divider 18, intervening portions of side walls 2,2', partition 13 and bottom wall 3, and which at the lower end thereof communicates with said connecting passage 19. Divider 18 cooperates with pane 7 and the included portions of side walls 2,2', bottom wall 3, and top wall 3' to define an outer vertical passage 21 which, just as inner passage 20, extends the full width of said casing 1. At its upper end passage 21 communicates with upper passage 14, as at 21'. From FIG. 3 it will be observed that inner and outer passages 20,21, respectively, are interconnected at their lower ends through passage 19 but are effectively separated at their upper ends where, as described above, the same are continuous with passages 15,14, respectively, for constituting a circulation path through unit A. Such path is indicated by arrows in FIG. 3 demonstrating cool air from within the space interiorly of the involved window flowing into, and forwardly along duct passage 15, thence downwardly along inner passage 20, through connecting passage 19, and then upwardly along outer passage 21 for return to said interior space via upper passage 14.

Disposed within passage 21 for extension throughout the entire width thereof is a heat collector 22 which is constructed from relatively thin gage metal sheet stock and being surfacewise treated with a head absorptive preparation, such as, for example only, dull black paint, and with said collector being contoured in a generally pleated, or accordian fold, fashion to develop alternating front and rearwardly opening V-shaped channels, as indicated at 23,24, respectively. It will be seen that the lower edge of collector 22 is substantially aligned with the bottom edge of divider 18 and with the upper edge being substantially flush with the upper surface of partition 13. Air flowing upwardly within outer passage 21 will thus move within said channels 23,24. Collector 22 is so formed that the mutually diverging surface portions 25,25' of each front V-shaped channel 23 serves to conduce to the absorption of any heat that may be reflected therebetween. Furthermore, the generally sinuate configuration of collector 22 effectively increases the heat absorption area relative to a flat plate that might have been presented in lieu thereof. Said collector A is secured in any suitable manner as by tacking in its lateral portions to the walls 2,2' or by securement to retainer 6 through end flanges.

Provided for closurewise disposition across the upper end 21' of outer passage 21 is a plate 26 swingably mounted on its forward edge to hinge h affixed, as by a suitable adhesive to front pane 7 or, if desired, by pivot pins (not shown) fixed within walls 2,2'. Said plate 26 is thus adapted to be rocked downwardly into passage-closing position as shown in full lines in FIG. 3 and upper or passage-open condition as illustrated in phantom lines in said FIG. 3. Controlling the movement of closure plate 26 is a bimetallic element 27, as of the usual coiled character, which is suitably fixed, on the proximate side wall 2, or 2', as by a pin or fastener p, and having its outer end 27' fixed to plate 26, as within a slot at 28; said element 27 thus being located within the passage 21. If desired, it is apparent that a pair of such elements 27 may be utilized, as at either end of said plate 26. Said elements 27 for purposes appearing hereinbelow, is set to expand and contract at preselected temperatures for swinging plate 26 into open-and-closed condition, respectively.

In usage, with solar heating unit A mounted with respect to the particular building window in either of the manners above described, the pane-provided front thereof will be positioned for reception of solar radiation and by reason of the peculiar constructions of said unit A minimal obstruction will be presented to the associated window so that normal viewing and light penetration therethrough will not be impeded. The heat from the sun's rays will pass through pane 7 for impingement upon the forwardly presented surfaces of collector 22 for absorption thereby, thus causing the temperature of said collector 22 to rise so that the volume constituting passage 21 together with the constituent channels 24,23 are relatively warm. It is, of course, obvious that the temperature of the various surfaces of collector 22 will be dependent upon the temperature of the sun's rays striking collector 22. Accordingly, collector 22 constitutes a heat exchanger.

Through normal convection the air within passage 21 will absorb heat from collector 22 and thereby flow upwardly through the open end 21' and into upper passage 14 for discharge through warm air outlet 16 into the spacing interiorly of the particular window for heating purposes. The displaced cooler air within such space will accordingly flow outwardly through inlet 17, thence through passages 15, 20, 19 as above described, for exposure to the heated collector 22 for heat transfer purposes. Thus, the circulation through heating unit A will be continuous through natural convection so that there is no need for costly, complex expedients for forcing air flow.

When the temperature of passage 21, as developed by the heat absorbed by collector 22, descends to a pre-established level, bimetallic element 27 will contract and, hence, draw plate 26 downwardly into closing disposition with respect to the upper end 21' of passage 21 and thereby deny further flow along passage 14 and hence inhibit continued circulation through unit A.

Said heating unit A will remain in such inoperative condition until the temperature within passage 21 reascends to a predetermined level whereby bimetallic member 27 will expand to cause plate 26 to rock into open condition to reinstate circulation within said unit A as above described.

By means of such simple, yet efficient, control, there is obviated the contingency that relatively cool air may be distributed to the space being treated, such as during night.

From the foregoing it will be seen that solar heating unit A is an entirely self-contained device which is adapted for presentation on the exterior of a building rather than interiorly thereof to prevent usurping inside spacing.

Furthermore, as pointed out, solar heating unit A is devoid of costly moving parts thereby conducing to longevity of usage without requiring maintenance or repair.

As merely examplary of the efficacy of the present invention, it has been found that with a casing having a frontal area of between 8 and 10 square feet, solar heating unit A has a daily average heating output of 10,000 btu's under the following conditions:

Sky clear and full sunshine on the collector from 9:00 A.M. to 3:00 P.M. (cst) and during the months October 1 through April 1, with an average outside temperature of 40° and a wind velocity of 5 miles per hour the temperature of the interior space will be 70°.

The only maintenance required of heating unit A is the removal of dust, lint, or other foreign matter from collector 22 in order to maintain same at maximum heat efficiency for heat transfer and with access thereto being gained by either rendering retainer 6 and pane 7 readily removable or by so constructing unit A that duct D and the adjacent portions of casing 1 may be lifted.

It is indeed apparent from the foregoing that solar heating unit A may be maintained within the framework of a conventional window or other opening having a horizontally slideable closure as distinguished from a vertically movable sash. With such construction solar heating unit A while resting upon the sill of the opening will be firmly maintained against displacement by gripping of duct section D between such closure and the opposed jamb, with the sides 12,12' being in engagment with the edge of the closure and the opposed jamb. Any spacing above unit A between such closure and the jamb may be occluded by any convenient expedient.

Having described my invention what I claim and desire to obtain by Letters Patent is:

1. A solar heating unit for disposition exteriorly of a building window comprising means defining a casing having top and bottom walls, a pair of side walls, a front wall and a rear wall, said casing being provided internally with first and second vertically presented passages, means connecting said first and second passages at their lower ends, said casing having first duct-forming means extending rearwardly from the upper portion of the rear wall thereof and being in communication with said first passage in its upper portion, said casing also having second duct-forming means extending rearwardly from the rear wall thereof communicating with said second passage in the upper portion thereof, said first and second duct-forming means constituting a casing support extension being located in relatively remote, elevated relationship to the lower portion of said casing rear wall, there being a fluid inlet at the end of said first duct-forming means remote from the communication thereof with said first passage, there being a fluid outlet in the portion of said second duct-forming means remote from the communication thereof with said second passage, a heat pervious component provided in said front wall and substantially defining one portion of said second passage, and heat exchanging means provided within said second passage.

2. A solar heating unit as defined in claim 1 and further characterized by said second duct-forming means being in immediate underlying relationship to said first duct-forming means, and means integrating said first and second duct-forming means whereby said casing support extension is unitary.

3. A solar heating unit as defined in claim 1 and further characterized by said first duct-forming means being of less length than said second duct-forming means whereby said fluid outlet is located rearwardly of said fluid inlet.

4. A solar heating unit as defined in claim 1 and further characterized by there being a closure rockably mounted on said casing for movement between open and closed condition with respect to the upper end portion of said second passage, and thermally responsive means operatively engaged to said closure for effecting movement of same into said closed condition when the temperature within said second passage has descended to a predetermined level.

5. A solar heating unit as defined in claim 1 and further characterized by said heat exchanging means being a heat collector constructed of sheet material and contoured to define alternating rearwardly opening and forwardly opening channels.

6. A solar heating unit as defined in claim 1 wherein the major axes of said first and second passages are parallel, and the major axes of said first and second ducts being mutually parallel and respectively perpendicular to said first and second passages.

7. A solar heating unit as defined in claim 1 and further characterized by a divider provided interiorly of said casing in planar parallel relationship to the rear wall and the heat pervious component for defining with the adjacent portions of said casing said first and second passages with said first passage being located between said divider and said rear wall and said second passage being defined by said divider and said heat pervious component.

8. A solar heating unit as defined in claim 7 and further characterized by said means connecting said first and second passages being a communication passage presented between said casing lower wall and the lower end of said divider.

9. A solar heating unit as defined in claim 7 and further characterized by said heat exchanging means being a heat collector constructed of sheet material and contoured to define rearward channels opening toward said divider and forward channels opening toward said heat pervious component.

10. A solar heating unit as defined in claim 9 and further characterized by said heat collector having a height substantially coextensive with said divider and a width substantially coextensive with that of said divider.

11. A solar heating unit as defined in claim 1 and further characterized by said casing having a peripheral mounting flange presented forwardly of the portions of said first and second duct-forming means projecting rearwardly of said casing rear wall.

12. A solar heating unit for disposition exteriorly of a building window comprising means defining a casing, said casing having first and second vertically presented passages, means connecting said first and second passages at the lower ends thereof, first duct-forming means communicating with said first passage at the upper end thereof, second duct-forming means in communication with said second passage at the upper end thereof, said first and second duct-forming means being located one above the other and extending substantially perpendicular to said passage to form a support for said unit when mounted in a window, there being a closure rockably mounted on said casing for movement between closed and open condition with respect to the upper end of said second passage, thermally responsive means operatively engaged to said closure for effecting movement of same into closed condition when the temperature within said second passage has descended to a predetermined level, a heat pervious component defining one portion of said second passage, and heat exchanging means provided within said second passage.

13. A solar heating unit as defined in claim 4 and further characterized by said thermally responsive means being a bi-metallic element.

14. A solar heating unit as defined in claim 13 and further characterized by said heat pervious component being a pane of glass.

15. A solar heating unit as defined in claim 12 and further characterized by said heat exchanging means being a heat collector constructed of sheet material and contoured to define alternating rearwardly and forwardly opening channels.

16. A solar heating unit as defined in claim 12 and further characterized by said thermally responsive means being a bimetallic element located within said second passage.

17. A solar heating unit as defined in claim 16 and further characterized by said heat pervious component being a pane of glass.

* * * * *